United States Patent Office.

DANIEL WIGG, OF HYDE PARK, NEW YORK.

Letters Patent No. 85,714, dated January 5, 1869.

IMPROVED OINTMENT.

The Schedule referred to in these Letters Patent and making part of the same.

To all whom it may concern:

Be it known that I, DANIEL WIGG, of the town of Hyde Park, in the county of Dutchess, and State of New York, have invented an Ointment which will cure galls, scratches, cracked heels, grease, cuts, and sores on horses and cattle; and I do hereby declare that the following is a full and exact statement of the ingredients of which it is made, and the manner of compounding it.

To enable others skilled in the art to make and use my invention, I will proceed to describe the manner of compounding and using it.

I take seven pounds of lard, put it into an ordinary tin pan, and warm it over a fire until the lard becomes very soft and pliable. I then take it from the fire, and mix with the lard seven ounces of pulverized sulphur, six ounces of charcoal, pulverized, two and one-half ounces pulverized verdigris, five ounces borax, pulverized, and three ounces of pulverized alum.

After mixing them well, by stirring them with a wooden spoon, I grind the mixture in a mill, such as is used by painters for grinding paint. When ground, I again stir it with a wooden spoon, for the purpose of thoroughly blending the ingredients.

I then leave it undisturbed three or four days, in a tin or wooden vessel, either covered or uncovered, after which time it is ready for use.

If I desire to increase the quantity of the ointment, I can do so by increasing the amount of each of the above-mentioned ingredients, so that they will bear the same relative proportion to each other as those do which I have above stated.

In using said ointment, the following directions should be observed:

Cut the hair short, clean the part affected with a cloth or sponge, and apply the ointment morning and night, by rubbing it on the sore until a cure is effected.

What I claim as my invention, and desire to secure by Letters Patent, is—

An ointment, compounded of the aforesaid ingredients, and in the manner above mentioned, which will cure scratches, cracked heels, grease, galls, cuts, and sores on horses and cattle.

DANIEL WIGG.

Witnesses:
CHARLES D. WIGG,
JOHN HACKETT.